United States Patent
Opsahl-Ong et al.

(10) Patent No.: US 7,606,755 B2
(45) Date of Patent: Oct. 20, 2009

(54) SYSTEMS AND METHODS TO AUTOMATICALLY GENERATE A RETURN TARGET FOR A POTENTIAL REAL ESTATE DEAL BASED ON SUPPLEMENTAL DEAL INFORMATION

(75) Inventors: Lorinda R. Opsahl-Ong, Darien, CT (US); Jayne L. Day, South Salem, NY (US); Dan Earle, North Haven, CT (US)

(73) Assignee: General Electric Capital Corporation, Stamford, CT (US)

(*) Notice: Subject to any disclaimer, the term of this patent is extended or adjusted under 35 U.S.C. 154(b) by 1336 days.

(21) Appl. No.: 10/066,300

(22) Filed: Jan. 31, 2002

(65) Prior Publication Data

US 2003/0144945 A1    Jul. 31, 2003

(51) Int. Cl.
    *G06Q 40/00*    (2006.01)
(52) U.S. Cl. .................. 705/36 R; 705/35; 705/38
(58) Field of Classification Search ........... 705/35, 705/37, 38, 36 R
    See application file for complete search history.

(56) References Cited

U.S. PATENT DOCUMENTS

| | | | |
|---|---|---|---|
| 6,078,901 A | 6/2000 | Ching | |
| 6,167,384 A | 12/2000 | Graff | |
| 6,192,347 B1 | 2/2001 | Graff | |
| 6,564,190 B1 * | 5/2003 | Dubner | 705/36 R |
| 6,823,319 B1 * | 11/2004 | Lynch et al. | 705/38 |
| 7,310,618 B2 * | 12/2007 | Libman | 705/38 |
| 2002/0082903 A1 * | 6/2002 | Yasuzawa | 705/10 |
| 2002/0123960 A1 * | 9/2002 | Ericksen | 705/38 |
| 2002/0169658 A1 * | 11/2002 | Adler | 705/10 |
| 2002/0198821 A1 * | 12/2002 | Munoz | 705/38 |
| 2003/0105708 A1 * | 6/2003 | Lee | 705/38 |
| 2003/0110045 A1 * | 6/2003 | Kehrli et al. | 705/1 |
| 2004/0015389 A1 * | 1/2004 | Dubner | 705/10 |

OTHER PUBLICATIONS

Lisa Mayfield, "Financial analysis software takes one giant leap," Aug. 2000, National Real Estate Investor, 42, 9, pp. 70-74.*
Martin Sinderman, "Whatever you do, there's a software for you," Jan. 1998, National Real Estate Investor, 40, 1, pp. 56-64.*
www.dynasoftware.com, Aug. 20, 2000, http://web.archive.org (Wayback Machine), pp. 1-28.*

* cited by examiner

*Primary Examiner*—Jagdish N Patel
*Assistant Examiner*—Kenneth Bartley
(74) *Attorney, Agent, or Firm*—Buckley, Maschoff & Talwalkar LLC (57) ABSTRACT

Systems and methods are provided to automatically generate a return target for a potential real estate deal based on supplemental deal information. According to one embodiment, a collateral type associated with a potential real estate deal is determined. For example, a deal originator may provide this information to deal controller via a communication network. Supplemental deal information associated with the deal is received, and a return target for the deal is then automatically generated based on the collateral type and the supplemental deal information. The return target may represent, for example, a loan spread required for approval of the deal.

14 Claims, 9 Drawing Sheets

| PRIOR DEAL IDENTIFIER 602 | COLLATERAL TYPE 604 | LTV 606 | NO. OF PROPERTIES 608 | CUSTOMER TIER 610 | APPROVED SPREAD 612 |
|---|---|---|---|---|---|
| D1001-2002 | OFFICE | 73% | 9 | I | 3.11% |
| D1002-2002 | RETAIL | 77% | 6 | II | 2.99% |
| D1003-2002 | MULTIFAMILY | 75% | 3 | III | 3.05% |

| POTENTIAL DEAL IDENTIFIER 702 | COLLATERAL TYPE 704 | LTV 706 | NO. OF PROPERTIES 708 | CUSTOMER TIER 710 | TARGET SPREAD 712 |
|---|---|---|---|---|---|
| D1001-2003 | RETAIL | 83% | 4 | II | 3.01% |
| D1002-2003 | HOTEL | 78% | 9 | I | 3.04% |
| D1003-2003 | INDUSTRIAL | 70% | 5 | III | 3.25% |

SYSTEMS AND METHODS TO AUTOMATICALLY GENERATE A RETURN TARGET FOR A POTENTIAL REAL ESTATE DEAL BASED ON SUPPLEMENTAL DEAL INFORMATION

FIELD

The present invention relates to real estate deals. In particular, the present invention relates to systems and methods to automatically generate a return target for a potential real estate deal based on supplemental deal information.

BACKGROUND

A potential real estate deal, such as a debt or equity transaction associated with a portfolio of commercial properties, is typically structured by a deal originator who works in the field with a customer. The deal originator may work with the customer, for example, to establish an appropriate size (e.g., an amount of money associated with the deal) and term (e.g., a number of years associated with the deal) for the potential deal. Because different deals can be associated with different risk characteristics, the potential deal may also be associated with a "return target," such as a minimum loan spread that will be required in order for that particular deal to be approved (e.g., based on the particular risk characteristics associated with that deal). For example, a potential deal with a substantial amount of risk would require a higher return target as compared to another potential deal with a lower amount of risk.

The return target for a potential deal is usually not determined by the deal originator, especially when the deal is associated with a large commercial transaction. Instead, the return target is may be determined by a chief risk manager (or even a risk committee) who reviews and approves transaction from a number of deal originators. For example, a deal originator may indicate the size and term of a potential deal to a risk manager along with a description of a collateral type (e.g., illustrating that the deal is associated with high quality retail properties) and a loan-to-value ratio. Based on this information, the risk manager determines the minimum loan spread that will be required in order for the deal to be approved.

Although such an approach can provide control over deal risks and returns, the review of a potential real estate transaction can take a considerable amount of time (especially when hundreds of potential deals are being considered). As a result, deal originators and customers can become impatient with the process. In addition, the parties can become frustrated if an ultimate decision (e.g., a loan spread that is required for a particular real estate deal) is not provided until after substantial time and effort have been expended.

Moreover, the approach can seem inconsistent to deal originators and customers who may not fully understand the decision-making criteria. For example, the approach might include, or might appear to include, subjective "gut-feel" risk assessments made by risk managers or committees. In addition to confusing customers, subjective assessments can lead to errors in decisions made by risk managers and/or committees.

SUMMARY

To alleviate problems inherent in the prior art, the present invention introduces systems and methods to automatically generate a return target for a potential real estate deal based on supplemental deal information.

According to one embodiment, a collateral type associated with a potential real estate deal is determined. Supplemental deal information associated with the potential real estate deal is received, and a return target for the potential real estate deal is automatically generated based on the collateral type and the supplemental deal information.

According to another embodiment, a collateral type and a loan-to-value ratio associated with a potential commercial real estate debt transaction are determined, and a base loan spread is determined in accordance with the collateral type and the loan-to-value ratio. Supplemental transaction information is also received from a deal originator device. The base loan spread is then increased in accordance with at least one risk adder and decreased in accordance with at least one risk mitigant to generate a target loan spread for the potential real estate deal. An indication of the target loan spread is then transmitted to the deal originator device via a communication network.

According to still another embodiment, a collateral type associated with a potential real estate deal is provided to a deal controller. Supplemental deal information associated with the potential real estate deal is also provided, and an automatically generated return target is received from the deal controller, the return target being based on the collateral type and the supplemental deal information.

One embodiment of the present invention comprises: means for determining a collateral type associated with a potential real estate deal; means for receiving supplemental deal information associated with the potential real estate deal; and means for automatically generating a return target for the potential real estate deal based on the collateral type and the supplemental deal information.

Another embodiment of the present invention comprises: means for determining a collateral type associated with a potential commercial real estate debt transaction; means for determining a loan-to-value ratio associated with the potential commercial real estate transaction; means for determining a base loan spread in accordance with the collateral type and the loan-to-value ratio; means for receiving supplemental transaction information from a deal originator device; means for increasing the base loan spread in accordance with at least one risk adder; means for decreasing the base loan spread in accordance with at least one risk mitigant to generate a target loan spread for the potential real estate deal; and means for transmitting an indication of the target loan spread to the deal originator device via a communication network.

Still another embodiment of the present invention comprises: means for providing to a deal controller a collateral type associated with a potential real estate deal; means for providing to the deal controller supplemental deal information associated with the potential real estate deal; and means for receiving from the deal controller an automatically generated return target, the return target being based on the collateral type and the supplemental deal information.

With these and other advantages and features of the invention that will become hereinafter apparent, the invention may be more clearly understood by reference to the following detailed description of the invention, the appended claims, and the drawings attached herein.

DETAILED DESCRIPTION

Some embodiments of the present invention are directed to systems and methods to automatically generate a return target for a "potential real estate deal." As used herein, the phrase "potential real estate deal" may refer to, for example, a debt transaction associated with a commercial real estate property, such as a loan, a mortgage, and/or a commercial mortgage backed security. In addition, a potential real estate deal may refer to an equity transaction, such as a leveraged equity deal or a full equity purchase. Note that a single deal could be associated with a number of different properties, such as a number of properties in a commercial real estate portfolio. Moreover, a deal may comprise an adjustment to an existing deal (i.e., an existing debt or equity deal).

Similarly, some embodiments of the present invention are also associated with "supplemental deal information." In the case of a debt transaction, the term "supplemental deal information" refers to any information associated with the deal other than a collateral type or loan-to-value information. In the case of an equity transaction, supplemental deal information refers to any information associated with the deal other than a collateral type. Supplemental information may refer to, for example, a collateral quality or a market risk associated with a potential real estate deal.

Deal System

Figure 1:
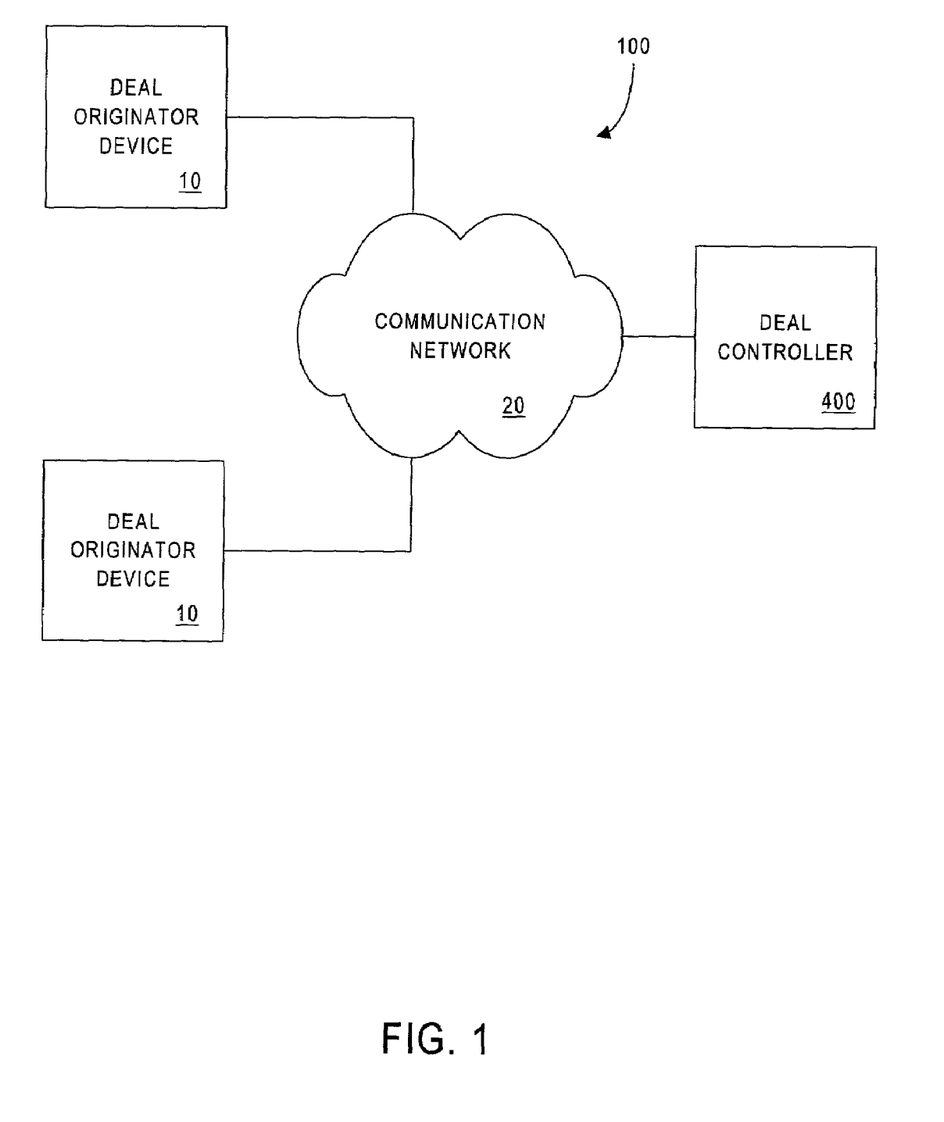
FIG. 1 is a block diagram of a deal system according to some embodiments of the present invention.

Turning now in detail to the drawings, FIG. 1 is a block diagram of a deal system 100 according to some embodiments of the present invention. The deal system 100 includes a deal controller 400 in communication with number of deal originator devices 10 through a communication network 20. The communication network 20 may comprise, for example, a Local Area Network (LAN), a Metropolitan Area Network (MAN), a Wide Area Network (WAN), a proprietary network, a Public Switched Telephone Network (PSTN), a Wireless Application Protocol (WAP) network, or an Internet Protocol (IP) network such as the Internet, an intranet or an extranet. The communication network 20 may also comprise a number of different networks.

The deal controller 400 and the deal originator devices 10 can be any devices capable of performing the various functions described herein. The deal controller 400 may be, for example, a Web server adapted to perform calculations and provide results in a substantially real-time fashion. A deal originator device 10 may be, for example, a Personal Computer (PC) adapted to run a Web browser application (e.g., the INTERNET EXPLORER® application available from MICROSOFT®), a portable computing device such as a laptop computer or a Personal Digital Assistant (PDA), or a wireless telephone.

Although a single deal controller 400 is shown in FIG. 1, any number of deal controllers 400 may be included in deal system 100. Similarly, a single device may act as both a deal controller 400 and a deal originator device 10. Note that the devices shown in FIG. 1 need not be in constant communication. For example, the deal controller 400 may communicate with a deal originator device 10 on an as-needed or periodic basis.

Figure 2:
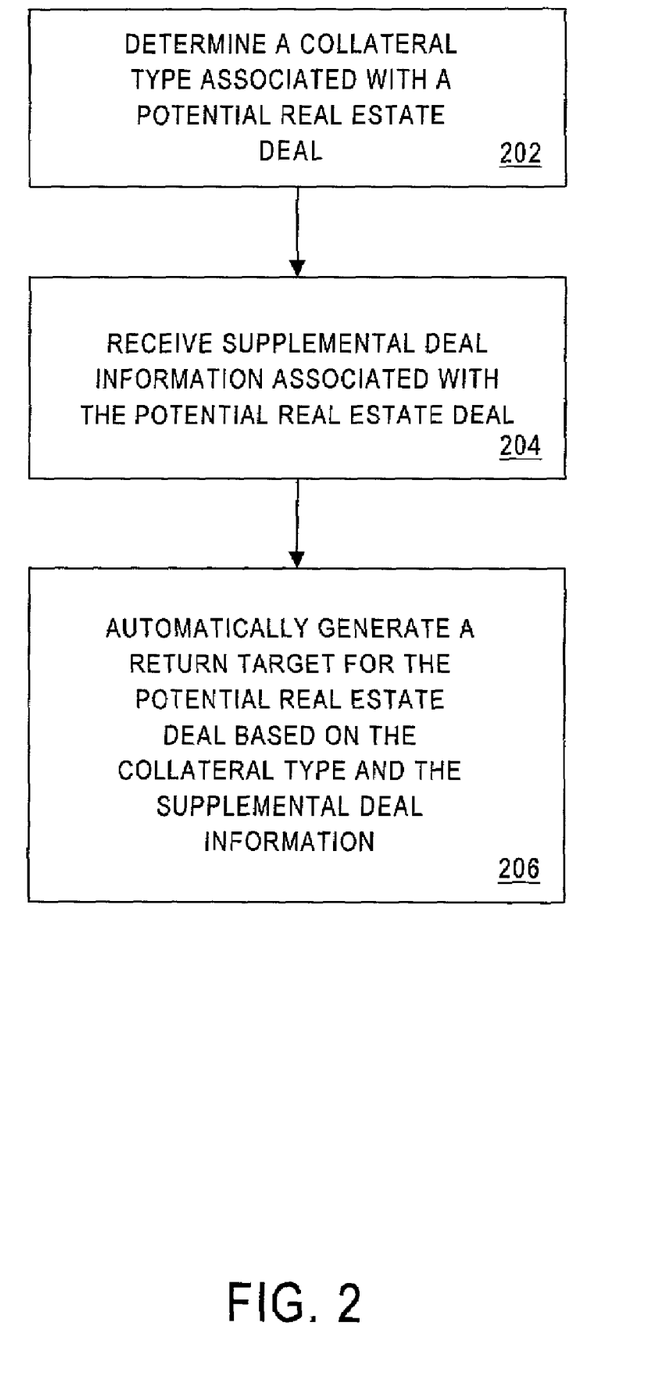
FIG. 2 is a flow chart of a method according to some embodiments of the present invention.

FIG. 2 is a flow chart of a method that may be performed by the deal controller 400 according to some embodiments of the present invention. The flow charts in FIG. 2 and the other figures described herein do not imply a fixed order to the steps, and embodiments of the present invention can be practiced in any order that is practicable.

At 202, a collateral type associated with a potential real estate deal is determined. For example, the deal controller 400 may receive the information from a deal originator device 10 (e.g., via a Web page or an electronic mail message). The collateral type may indicate, for example, a property category associated with the potential deal (e.g., "multifamily," "office," "retail," or "industrial"). In the case of an debt transaction, the deal controller 400 may also receive loan-to-value information from the deal originator device 10. The loan-to-value information may represent, for example, the loan-to-value ratio of the money borrowed to the fair market value of the property.

At 204, supplemental deal information associated with the potential real estate deal is received. For example, the deal controller 400 may receive one or more risk characteristics from a deal originator device 10. The supplemental deal information may be associated with, for example, deal size information (e.g., an amount of money associated with the potential deal), deal term information, a number of properties associated with the potential deal, collateral quality information, and/or a risk rating (e.g., an internally assigned market risk score).

The supplemental information may also be associated with lockbox information, sweep trigger information, rate cap information (e.g., the highest interest rate level that an adjustable-rate mortgage can rise to over a particular period of time), earn-out information, subordinated debt information, interest reserve information, renovation risk information, ground lease information, portfolio cross-collateralization information, credit tenant information, and/or annual rollover information. The supplemental information may also be associated with customer information, such as an internally assigned customer "tier."

In the case of an equity transaction, the supplemental deal information may further include, for example, leverage information, development deal information, and/or partnership structure information.

At 206, a return target for the potential real estate deal is automatically generated based on the collateral type and the supplemental deal information. In the case of a debt transaction, the return target may further be based on loan-to-value information. The return target may be associated with, for example, a return on investment value (e.g., a percentage representing an amount earned on the total capital), a net income value, an internal rate of return value, and/or a loan spread value. For example, the deal controller 400 may calculate a minimum return target expressed as a number of basis points over the London Inter-Bank Office Rate (LIBOR) that will be required for the potential deal to be approved.

According to one embodiment, the generation of the return target is performed via a rule-based system. For example, the rule-based system may be created in accordance with a statistical analysis of historical real estate deal information (e.g., risk characteristics and approved return values for a plurality of prior real estate deals and/or information provided by risk management experts). The statistical analysis might comprise, for example, a multivariate analysis and/or an artificial intelligence process (e.g., a neural network or case-based reasoning process). Such a rule-based system might also be validated using prior real estate deal information.

By way of example, the deal controller 400 may initially determine a base return target for the potential real estate debt transaction in accordance with the collateral type and the loan-to-value information (e.g., by retrieving the base return target from a matrix of values). The deal controller 400 might then increase the base return target in accordance with at least one risk adder (e.g., a risk adder identified in the supplemental deal information). Similarly, the deal controller 400 might decrease the base return target in accordance with at least one risk mitigant to generate an appropriate return target for the potential deal.

According to some embodiments, the deal controller 400 transmits an indication of the return target to a deal originator device 10 via the communication network 20 (e.g., via a Web page or an electronic mail message).

Information Flow Diagram

Figure 3:
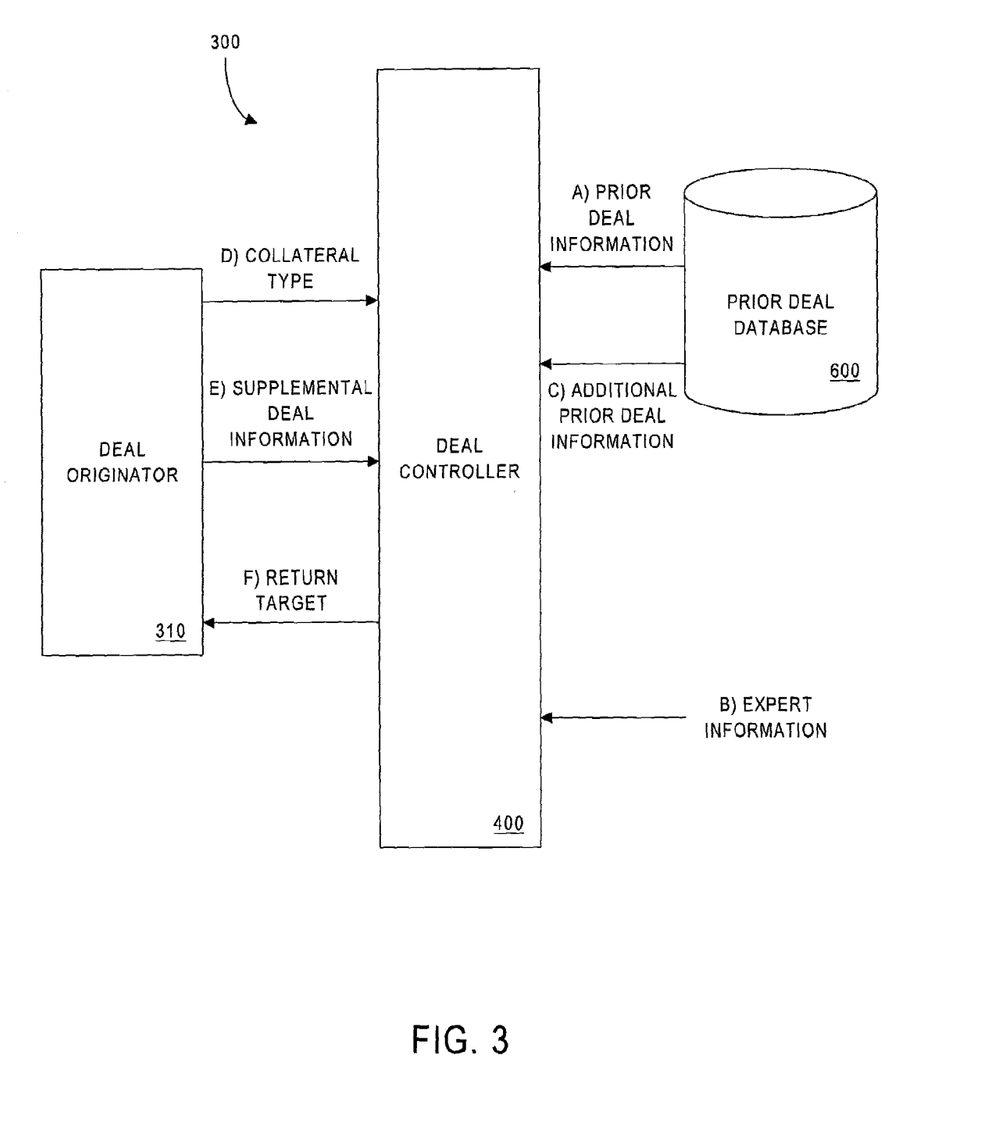
FIG. 3 is an information flow diagram according to some embodiments of the present invention.

FIG. 3 is an information flow diagram 300 according to some embodiments of the present invention. Note that a party associated with the deal controller 400 may initially establish Critical To Quality (CTQ) characteristics and define performance standards associated with real estate deals. In this way, one or more performance goals for the deal system 100 can be objectively measured.

Figure 6:
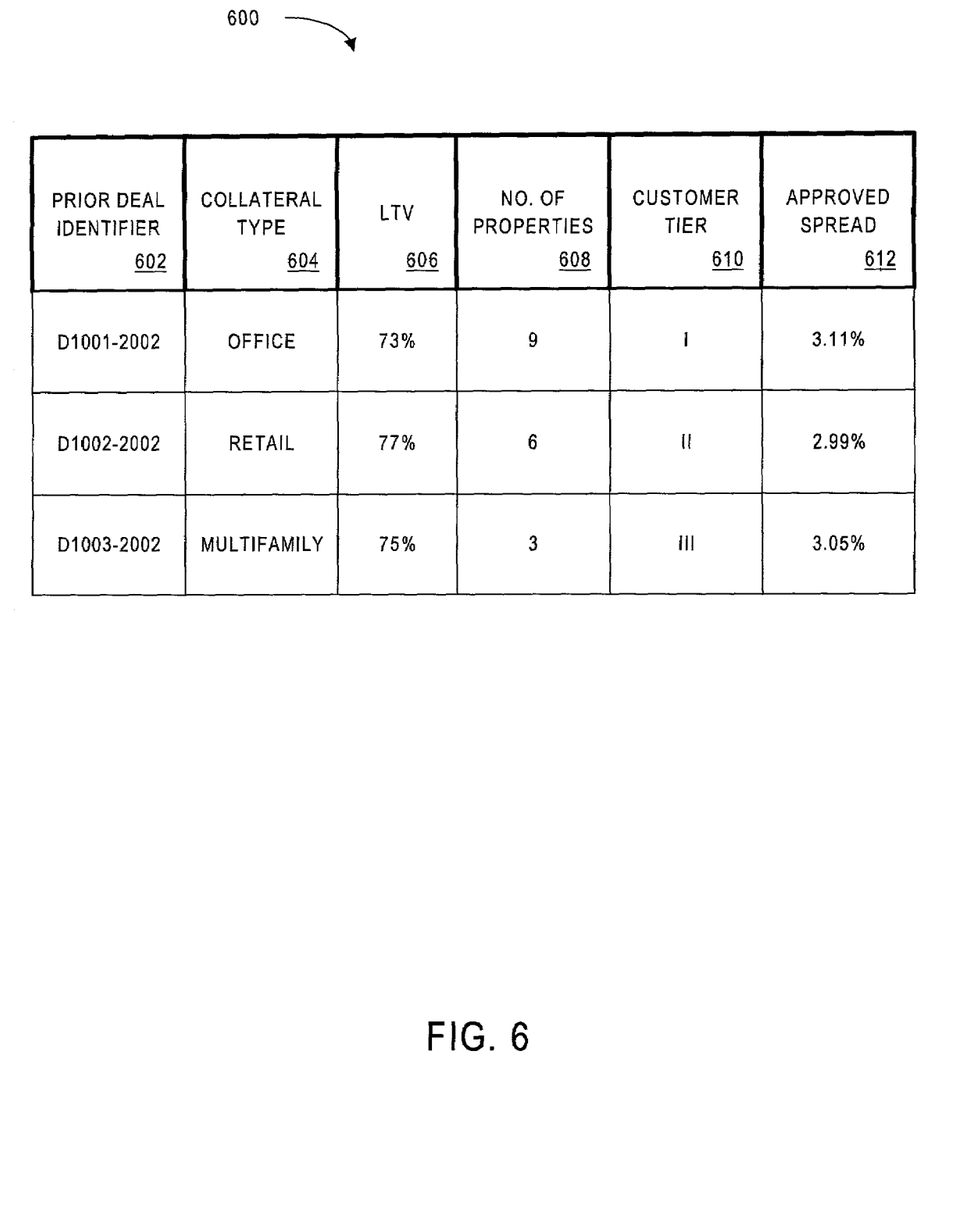
FIG. 6 is a tabular representation of a portion of a prior deal database according to an embodiment of the present invention.

Referring now to FIG. 3, the deal controller 400 receives prior deal information at (A) from a prior deal database 600 (described with respect to FIG. 6). The received information may comprise, for example, risk characteristics of approved deals and declined deals, along with as actual or approved return on investment values.

The deal controller 400 can then perform a statistical analysis (e.g., a multivariate regression analysis) on the received information to find significant variables that explain the variation in prior risk-based pricing (e.g., those variables that impacted risk-based pricing). Such an analysis may reduce the number of variables that need to be evaluated by the deal controller 400 (e.g., speeding up the deal evaluation process) and/or discover meaningful relationships between those variables.

The statistical analysis may result in the creation of a rule-based pricing model. For example, the deal controller 400 might identify a number of risk adders and risk mitigants based on the prior deal information. At (B), expert information is received by the deal controller 400. For example, a risk management expert might review and revise the rule-based pricing model as appropriate (e.g., by identifying additional risk characteristics that should be considered when generating a return target for a potential deal). The revised pricing model is then validated by the deal controller 400 using additional prior deal information received at (C) from the prior deal database 600. Note that the validation process might be based on the identified performance goals. Moreover, the validation process could be performed on a periodic basis (e.g., even after the rule-based pricing model is being used in the field by deal originators).

Once an appropriate rule-based pricing model is defined, deal originators 310 use the deal controller 400 to generate return targets for potential real estate deals. In particular, a deal originator 310 provides a collateral type (e.g., "multi-family," "mobile home park," "office," "retail," "industrial," "self-storage," or "hotel") to the deal controller 400 at (D). This information may be based on, for example, a fact sheet supplied by a potential customer. In the case of a debt transaction, the deal originator 310 may also provide loan-to-value information to the deal controller 400 at (D). The deal controller 400 then determines a base return target in accordance with the received information (e.g., by retrieving a value from a matrix of base return target values).

The deal originator 310 also provides supplemental deal information to the deal controller 400 at (E). The supplemental deal information may include, for example, one or more of the following basic deal parameters: a deal name, a current LIBOR, a deal size, a Debt Service Coverage Ratio (DSCR), an asset risk rating, an execution risk rating, a term (e.g., in years), a number of properties involved in the potential deal, a deal complexity rating, a commitment fee, and/or an exit fee. The supplemental information may also include a collateral quality (e.g., a quality rating of "A," "B," or "C") and/or market risk information (e.g., "low," "medium," "high," or "tertiary market"). In the case of an equity transaction, the supplemental deal information may include leverage information and/or development deal information.

The deal controller 400 can then identify one or more risk mitigants associated with the potential deal based on the supplemental deal information. Examples of risk mitigants may include: an internal risk rating below a pre-determined threshold, a DSCR above a pre-determined threshold, lock-box information, sweep trigger information, rate cap information, and/or customer tier information. The deal controller 400 might, for example, decrease the base return target in accordance with the risk mitigants (e.g., a good customer tier rating may deduct 25 basis points from a required loan spread).

Similarly, the deal controller 400 can identify one or more risk adders associated with the potential deal based on the supplemental deal information. Examples of risk adders may include: a risk rating above a pre-determined threshold, earn-out information, subordinated debt information, interest reserve information, a renovation risk (e.g., associated with a multifamily property), a ground lease length, and/or an indication that a portfolio is cross-collateralized. The deal controller 400 might, for example, increase the base return target in accordance with the risk adders (e.g., a subordinated debt may add 20 basis points to a required loan spread).

Note that information other then the information described above could be used by the deal controller 400 to adjust the base return target (e.g., a percentage of credit tenants, highest annual rollover information, a release price, or a percentage of cash equity).

The deal controller 400 then provides an appropriate return target to the deal originator 310 at (F). For example, the deal controller 400 might calculate a return on investment value that will be required in order for the potential deal to be approved. Similarly, a required loan spread might be calculated (e.g., based on the required return on investment and appropriate cost and tax assumptions). According to some embodiments, the return target is used to facilitate an approval or refusal of a credit request associated with a potential deal.

Thus, embodiments of the present invention may enable the creation of an effective pricing model based on prior deal information. In addition, input from a risk management team can be used to further improve the model by listing additional factors that should impact a decision—as well as how those factors will change a return target required for approval of a potential real estate deal.

Moreover, a Web-based decision tool can be developed to evaluate price and risk trade-offs at the front end of the deal process, enabling better deal structuring by deal originators 310 in the field. That is, the deal system 100 may provide deal originators 310 with direct access to the risk operation's concerns—and translate those concerns into actionable and quantitative prices (e.g., a deal originator 310 may input property, market, and structural information associated with a potential deal and get a target price that will be needed to get a that particular deal approved). Similarly, the deal system 100 may let a deal originator 310 quickly evaluate any price impact cause by changes in deal risk or structure.

Consider, for example, two similar commercial office portfolios having the same number of buildings in the same city. The first portfolio includes AT&T, KPMG, and IBM as tenants while the second portfolio includes AT&T, IBM, and PETSMART.COM as tenants. In accordance with the present invention, the pricing model may provide a consistent, fair, and complete evaluation that clearly quantifies the importance of the risk differences between the two portfolios (e.g., an increased risk associated with PETSMART.COM as compared to IBM would result in a higher required loan spread for the second portfolio). Because the system can provide fast and reliable deal quotes to customers and deal originators 310, the parties can focus on potential deals are more likely to be approved (which in turn may translate into a larger volume of approved deals).

Deal Controller

Figure 4:
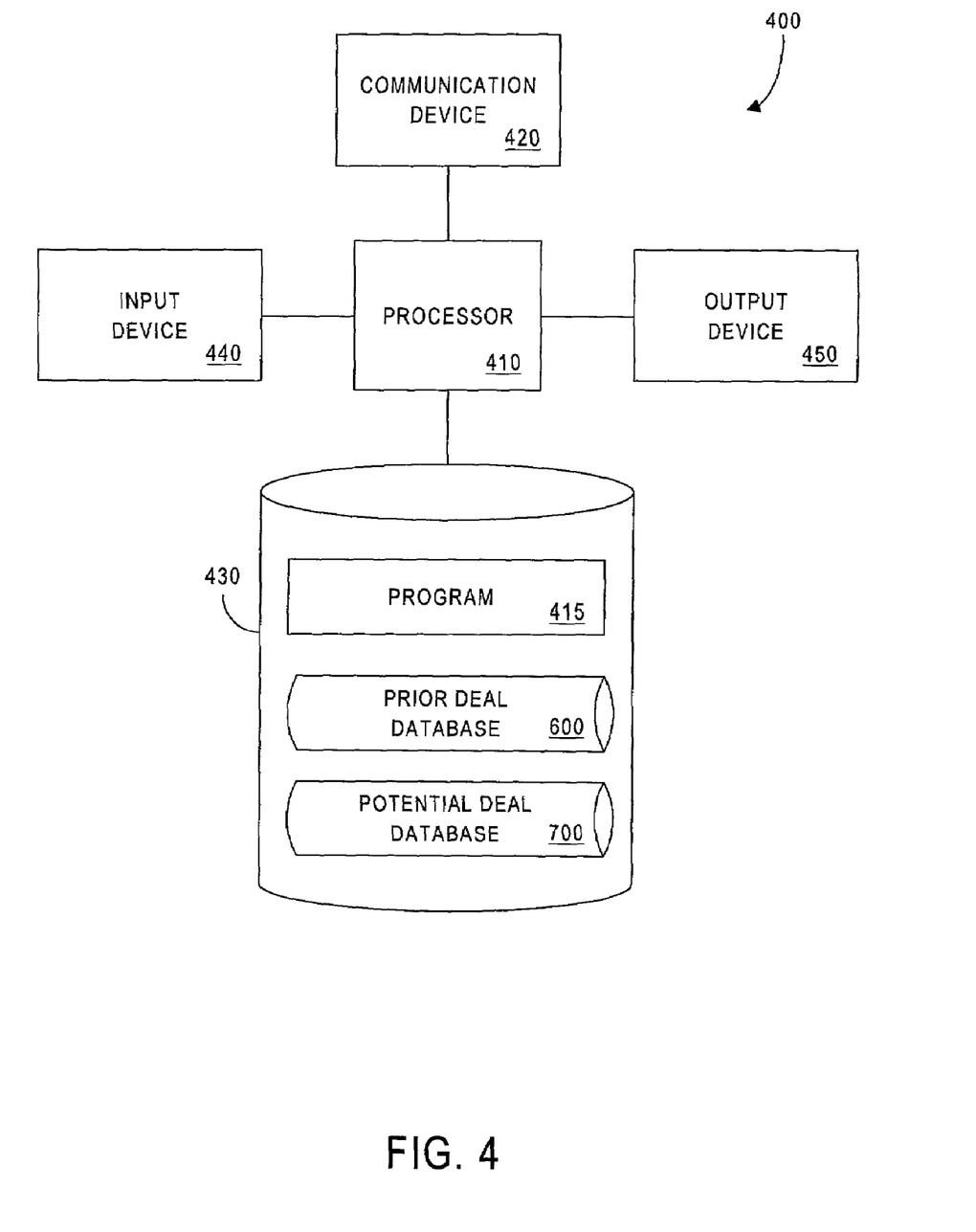
FIG. 4 is a block diagram of a deal controller according to an embodiment of the present invention.

FIG. 4 illustrates a deal controller 400 that is descriptive of the device shown, for example, in FIGS. 1 and 3 according to some embodiments of the present invention. The deal controller 400 includes a processor 410, such as one or more INTEL® Pentium® processors. The processor 410 is coupled to a communication device 420 which may be adapted to communicate with, for example, a number of deal originator devices 10. For example, the communication device 420 may exchange information with a deal originator device 10 via a Web-based deal information display 500 illustrated in FIG. 5. In particular, the display 500 can be used by a deal originator to provide deal information and to receive a return target for a potential real estate debt transaction.

The processor 410 is also in communication with an input device 440. The input device 440 may be, for example, a keyboard or a mouse used to provide information about a rule-based system and/or a real estate deal (i.e., a prior or potential real estate deal).

The processor 410 is also in communication with an output device 450. The output device 450 may be, for example, a display (e.g., a computer monitor) or a printer used to provide information about a rule-based system, a real estate deal, and/or a return target.

The processor 410 is also in communication with a storage device 430. The storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 430 stores a program 415 for controlling the processor 410. The processor 410 performs instructions of the program 415, and thereby operates in accordance with the present invention. For example, the processor 410 may determine a collateral type associated with a potential real estate deal. The processor 410 may also receive supplemental deal information associated with the potential real estate deal and automatically generate a return target based on the collateral type and the supplemental deal information.

As used herein, information may be "received" by or "transmitted" to a software application or module within the deal controller 400 from: (i) a deal originator device 10, (ii) another software application or module within the deal controller 400, or (iii) any other source.

Figure 7:
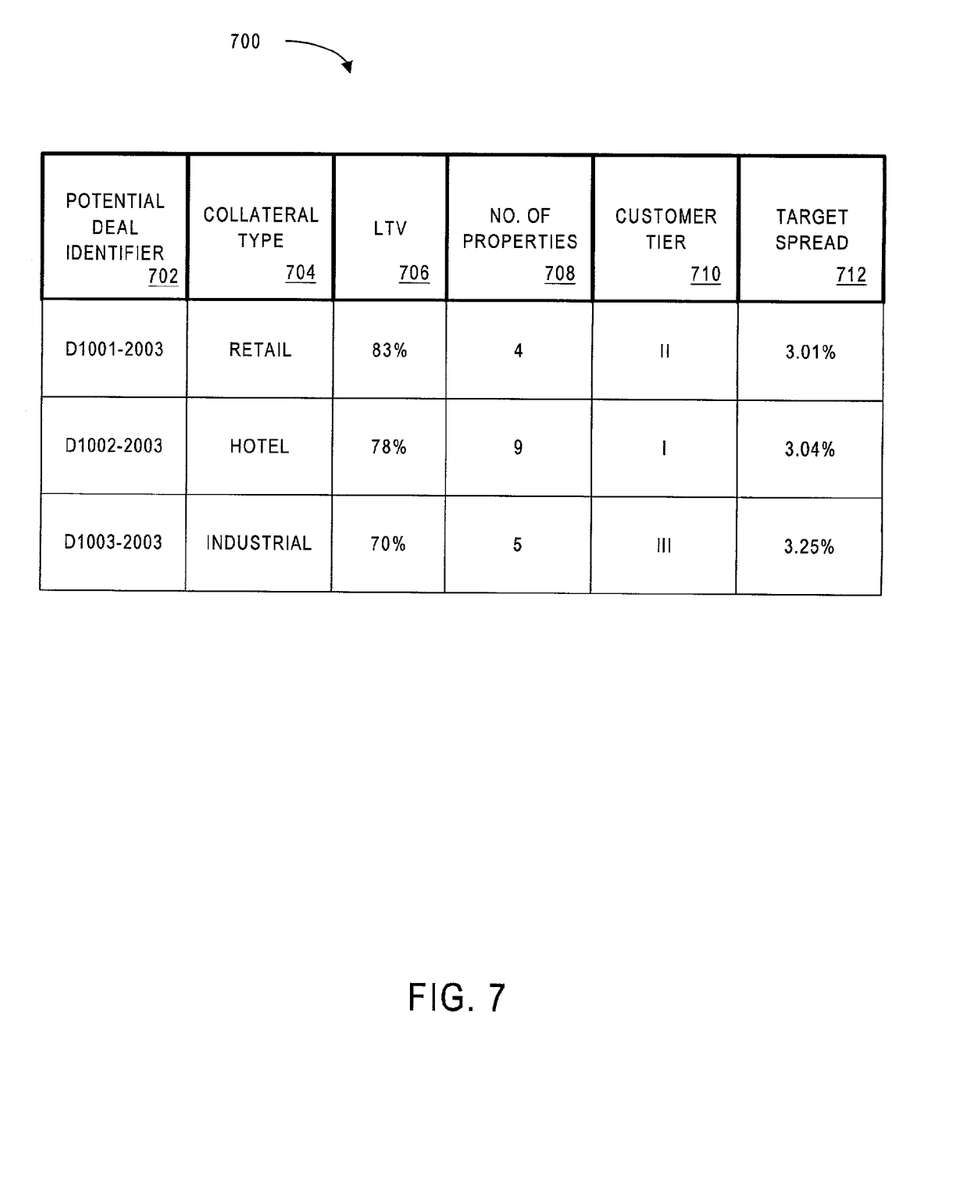
FIG. 7 is a tabular representation of a portion of a potential deal database according to an embodiment of the present invention.

As shown in FIG. 4, the storage device 430 also stores a prior deal database 600 (described with respect to FIG. 6) and a potential deal database 700 (described with respect to FIG. 7). Examples of databases that may be used in connection with the deal controller 400 will now be described in detail. The illustrations and accompanying descriptions of the databases presented herein are exemplary, and any number of other database arrangements could be employed besides those suggested by the figures.

Prior Deal Database

Referring to FIG. 6, a table represents the prior deal database 600 that may be stored at the deal controller 400 according to an embodiment of the present invention. The table includes entries identifying information that can be used to create a rule-based pricing model. The table also defines fields 602, 604, 606, 608, 610, 612 for each of the entries. The fields specify: a prior deal identifier 602, a collateral type 604, loan-to-value information 606, a number of properties 608, a customer tier 610, and an approved spread 612.

The prior deal identifier 602 may be, for example, an alphanumeric code associated with a prior real estate debt transaction that had been approved or denied (e.g., a unique code that indicates the year in which the deal was originated, approved, or denied). The collateral type 604 indicates the type of property that was associated with the deal (e.g., "office" or "retail"). The loan-to-value information 606 represents the loan-to-value ratio of the money borrowed to the fair market value of the property. The number of properties 608 indicates how many properties were associated with the deal, and the customer tier 610 may be an internal rating reflecting the "quality" of the customer associated with the deal. The approved spread 612 may indicate, for example, the loan spread that was required in order for the deal to be approved (e.g., or that was actually agreed upon for the deal).

Other information might also be stored in the prior deal database 600. For example, any of the supplemental information described with respect to FIGS. 1 and 3 could be stored in the prior deal database 600.

Potential Deal Database

Referring to FIG. 7, a table represents the potential deal database 700 that may be stored at the deal controller 400 according to an embodiment of the present invention. The table includes entries identifying information about potential real estate debt transactions. The table also defines fields 702, 704, 706, 708, 710, 712 for each of the entries. The fields specify: a potential deal identifier 702, a collateral type 704, loan-to-value information 706, a number of properties 708, a customer tier 710, and a target spread 712. The information in the potential deal database 700 may be created and updated, for example, based on information received from deal originator devices 10.

The potential deal identifier 702 may be, for example, an alphanumeric code associated with a potential real estate debt transaction (e.g., a unique code that indicates the year in which the deal was originated). The collateral type 704 indicates the type of property that is associated with the deal (e.g., "retail" or "hotel"). The loan-to-value information 706 represents the loan-to-value ratio of the money borrowed to the fair market value of the property. The number of properties 708 indicates how many properties are associated with the deal, and the customer tier 710 may be an internal rating reflecting the "quality" of the customer associated with the deal. The target spread 712 may indicate, for example, a loan spread that will be required in order for the deal to be approved.

Other information might also be stored in the potential deal database 700. For example, any of the supplemental information described with respect to FIGS. 1 and 3 could be stored in the potential deal database 700. According to another embodiment, the information in the prior deal database 600 and the potential deal database 700 is instead stored in a single database.

Deal System Methods

Figure 8:
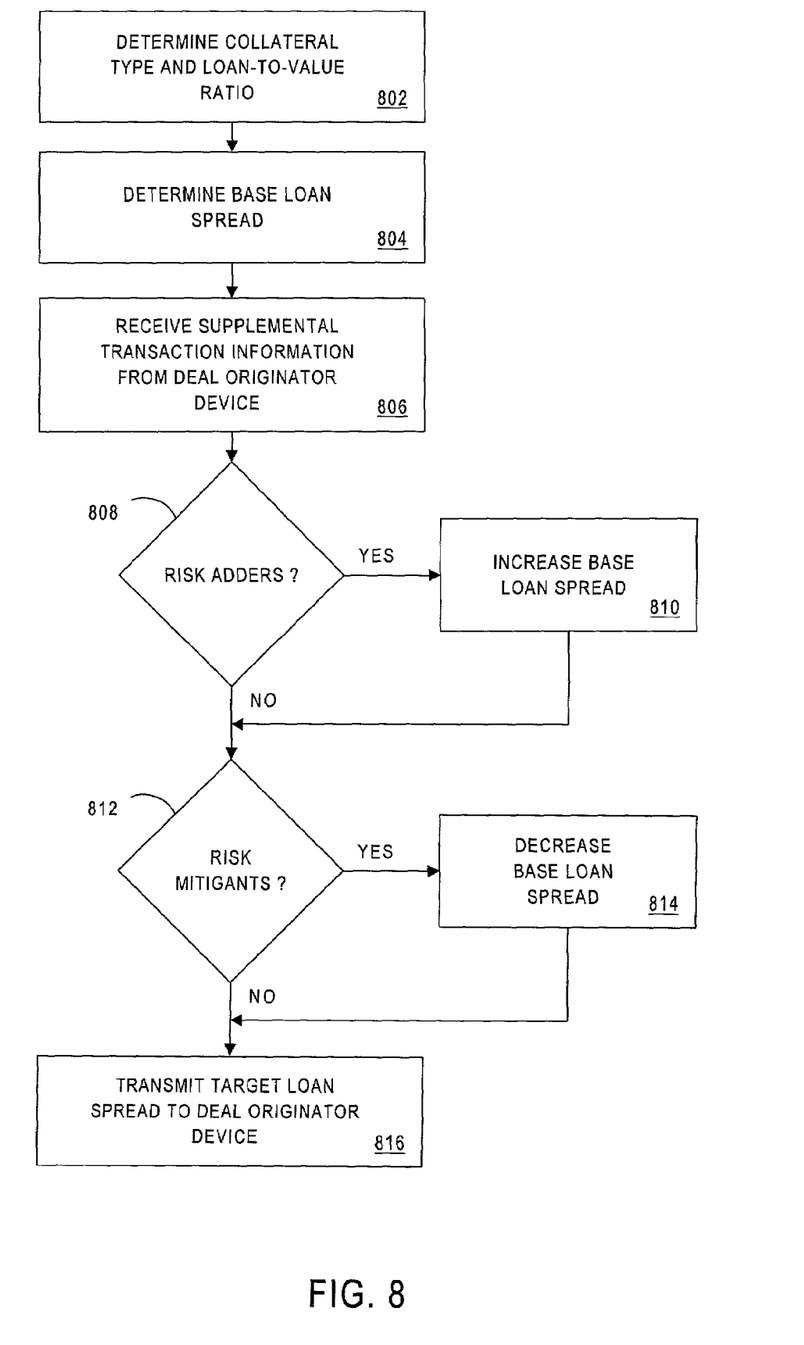
FIG. 8 is a flow chart of a computer-implemented method of generating target loan spreads for potential commercial real estate debt transactions according to some embodiments of the present invention.

FIG. 8 is a flow chart of a computer-implemented method of generating target loan spreads for potential commercial real estate debt transactions according to some embodiments of the present invention. At 802, a collateral type and a loan-to-value ratio associated with a potential commercial real estate debt transaction are determined. For example, the deal controller 400 may receive this information from a deal originator device 10 (e.g., via the deal information display 500 illustrated in FIG. 5) and store the collateral type 704 and loan-to-value information 706 in the potential deal database 700.

At 804, a base loan spread is determined in accordance with the collateral type and loan-to-value ratio. For example, the deal controller 400 may retrieve the collateral type 704 and loan-to-value information 706 from the potential deal database 700 and determine the base loan spread in accordance with a pre-determined formula or matrix of values.

Figure 5:
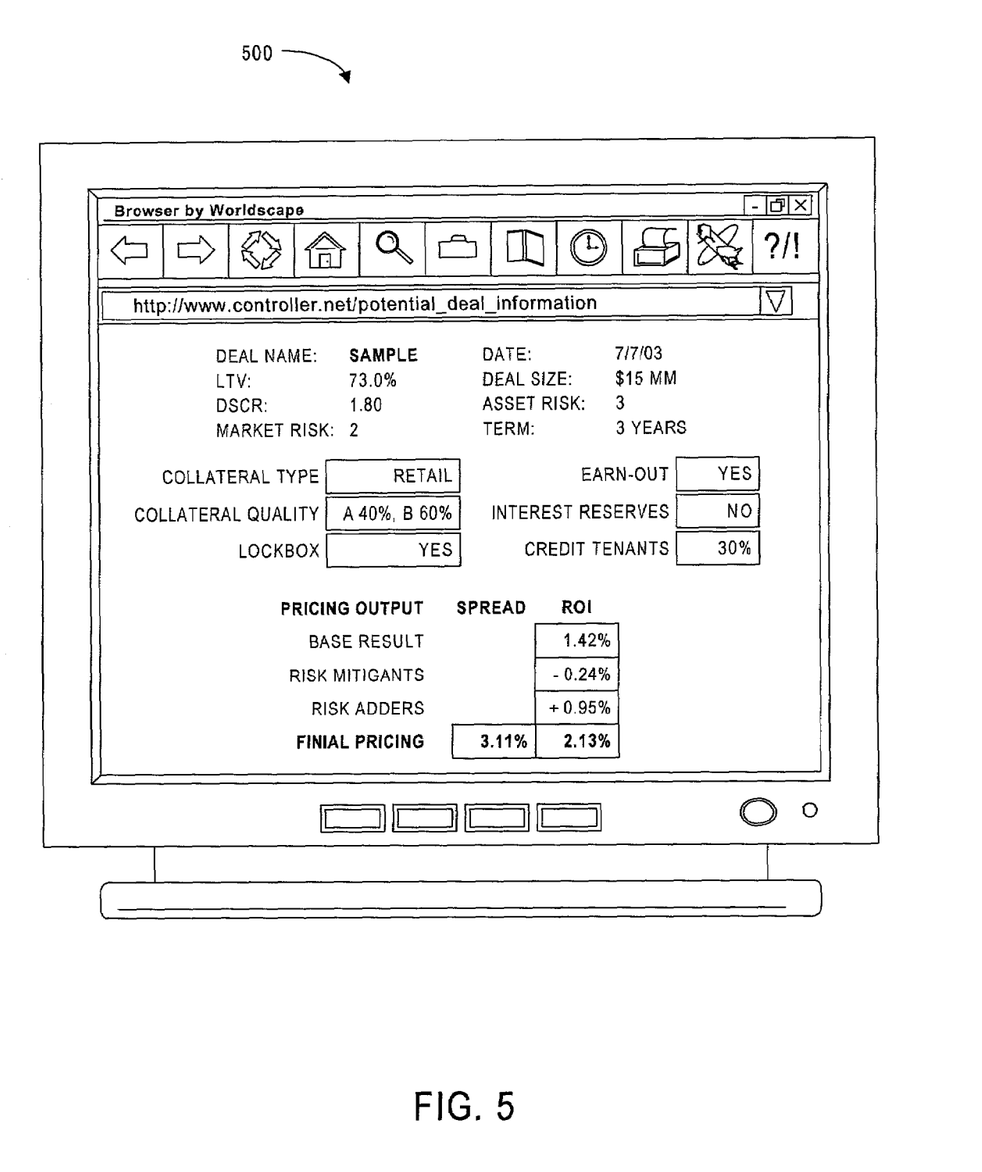
FIG. 5 illustrates a Web-based deal information display according to one embodiment of the present invention.

At 806, supplemental transaction information is received from a deal originator device 10 (e.g., via the deal information display 500 illustrated in FIG. 5). For example, the deal controller 400 may receive supplemental transaction information and store the number of properties 708 and customer tier 710 in the potential deal database 700.

If the supplemental transaction information is associated with any risk adders at 808, the deal controller 400 increases the base loan spread as appropriate at 810. Similarly, if the supplemental transaction information is associated with any risk mitigants at 812, the deal controller 400 decreases the base loan spread as appropriate at 814. After the base loan spread has been increased and/or decreased as appropriate, the deal controller 400 may store the target spread 712 in the potential deal database 700.

At 816, an indication of the target loan spread is transmitted to the deal originator device 10 via a communication network. For example, the deal controller 400 may transmit information enabling display of the final pricing information via the deal information display 500 illustrated in FIG. 5.

Figure 9:
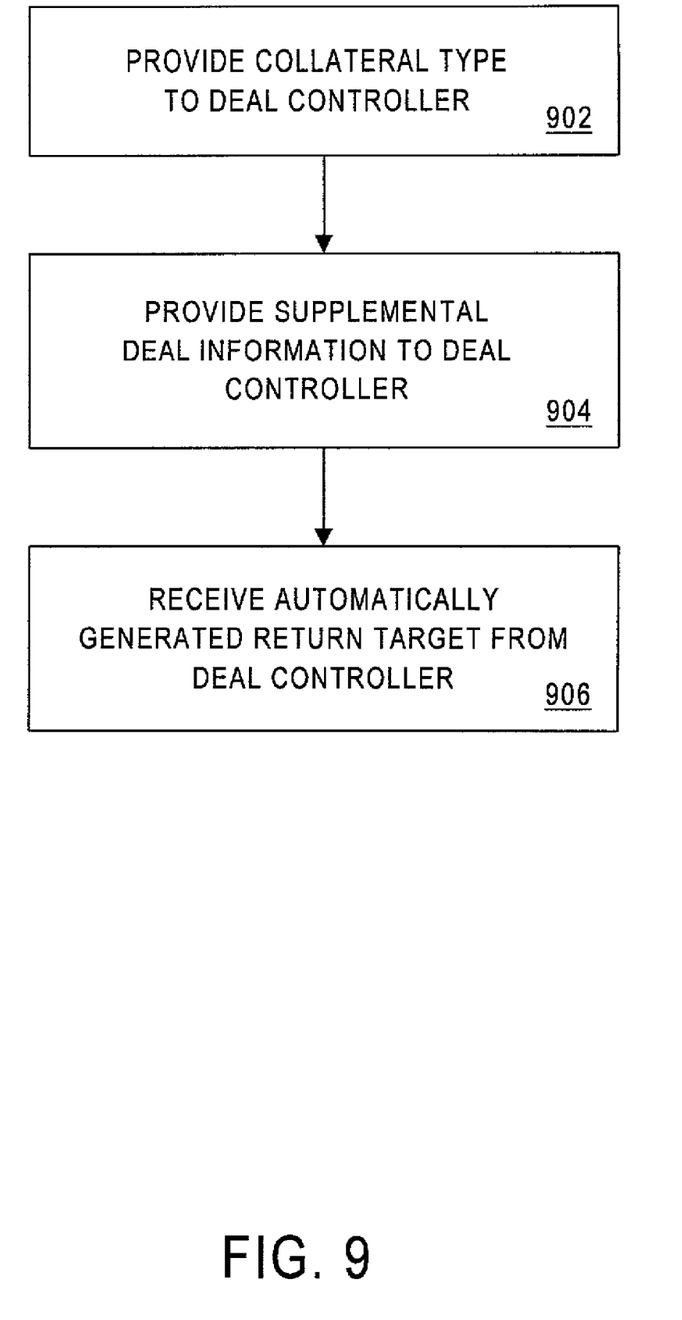
FIG. 9 is a flow chart of a deal originator method according to some embodiments of the present invention.

FIG. 9 is a flow chart of a deal originator method according to some embodiments of the present invention. At 902, a collateral type associated with a potential real estate deal is provided to the deal controller 400. Note that, in the case of a potential debt transaction, loan-to-value information may also be provided. Similarly, supplemental information is provided to the deal controller 400 at 904. This information may be provided, for example, via the deal information display 500.

At 906, an automatically generated return target is received from the deal controller 400, the return target being based on the collateral type and the supplemental deal information (and, in the case of potential debt transaction, the loan-to-value information). For example, the return target may be displayed to a deal originator via the deal information display 500.

Thus, embodiments of the present invention may provide a decision tool for structuring and pricing commercial real estate transactions. Moreover, the system may help ensure that transactions will meet any applicable criteria for risk and profitability at pricing levels acceptable to customers.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although a deal controller 400 performs many of the functions associated with the various embodiments of the present invention described herein, some or all of these functions could instead be performed by the deal originator device 10. For example, a rule-based pricing model stored at a deal originator's laptop computer may locally generate return targets based on supplemental deal information.

Similarly, one or more customer or third-party devices may be used in connection with embodiments of the present invention. For example, a customer device or third-party device (e.g., associated with a credit rating or market forecast service) may provide supplemental deal information to the deal controller 400.

Embodiments of the present invention may also be used in connection with an integrated deal flow and approval system. Such an integrated deal flow and approval system may, for example, be associated with deal origination, underwriting, and closing. Moreover, such a system could be associated with an asset management system.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer-implemented method of generating return targets for potential real estate deals, comprising:
   receiving, by a computer, prior real estate deal information from a prior deal data source;
   implementing by the computer a rule-based pricing system based on an analysis of the received prior real estate deal information;
   receiving, by the computer real estate deal information associated with a potential real estate deal;
   determining a collateral type associated with the potential real estate deal;
   receiving, by the computer, supplemental deal information associated with the potential real estate deal;
   automatically generating, by the computer, a base return target for the potential real estate deal based on applying the collateral type and the supplemental deal information to the rule-based pricing system, the base return target being at least one of: (i) a return on investment value, (ii) a net income value, (iii) an internal rate of return value, and (iv) a loan spread value;
   identifying a risk mitigant associated with the potential real estate deal based on the supplemental deal information;
   identifying a risk adder associated with the potential real estate deal based on the supplemental deal information;

inputting into the computer a value corresponding to the identified risk adder and risk mitigant;

revising the rule-based system in accordance with the value of the identified risk mitigant and the value of the identified risk adder;

receiving, by the computer additional prior real estate deal information;

validating, by the computer, the revised rule-based system based on an analysis of the additional prior real estate deal information; and automatically determining, by the computer, a return target loan spread for the potential real estate deal by adjusting the generated base return target in accordance with the value of the identified risk mitigant and the value of the identified risk adder, based on the validated rule-based system.

2. The method of claim 1, wherein the potential real estate deal comprises one of: (i) a debt deal, and (ii) an equity deal.

3. The method of claim 1, wherein the potential real estate deal comprise a debt deal, said determining further comprises determining loan-to-value information associated with the potential real estate deal, and said generating is further based on the loan-to-value information.

4. The method of claim 1, wherein the potential real estate deal is associated with at least one of: (i) a commercial real estate property, (ii) a commercial real estate portfolio, (iii) a loan, (iv) a mortgage, (v) a commercial mortgage backed security, (vi) a leveraged equity deal, (vii) a full equity purchase, and (viii) an adjustment to an existing real estate deal.

5. The method of claim 1, wherein the supplemental deal information comprises at least one of: (i) a risk characteristic, (ii) deal size information, (iii) deal term information, (iv) a number of properties, (v) collateral quality information, (vi) a risk rating, (vii) lockbox information, (viii) sweep trigger information, (ix) rate cap information, (x) customer information, (xi) earn-out information, (xii) subordinated debt information, (xiii) interest reserve information, (xiv) renovation information, (xv) ground lease information, (xvi) portfolio cross-collateralization information, (xvii) credit tenant information, (xviii) annual rollover information, (xix) leverage information, (xx) development deal information, and (xi) partnership structure information.

6. The method of claim 1, further comprising:
creating the rule-based system in accordance with a statistical analysis of prior real estate deal information.

7. The method of claim 6, wherein said creating comprises:
creating the rule-based system in accordance with at least one of: (i) risk characteristics and approved return values for a plurality of prior real estate deals, and (ii) expert information.

8. The method of claim 1, further comprising:
transmitting an indication of the return target to a deal originator device via a communication network.

9. The method of claim 8, wherein the deal originator device comprises at least one of: (i) a personal computer, (ii) a portable computing device, and (iii) a telephone device.

10. The method of claim 8, wherein the communication network comprises at least one of: (i) the Internet, (ii) an intranet, (iii) a public network, (iv) a public switched telephone network, (v) a proprietary network, (vi) a wireless network, and (vii) a local area network.

11. A deal controller, comprising:
a processor; and
a storage device in communication with said processor and storing instructions adapted to be executed by said processor to:

receive prior real estate deal information from a prior deal data source;

implementing a rule-based pricing system based on an analysis of the received prior real estate deal information;

receive real estate deal information associated with a potential real estate deal;

determine a collateral type associated with the potential real estate deal;

receive supplemental deal information associated with the potential real estate deal;

automatically generate a base return target for the potential real estate deal based on applying the collateral type and the supplemental deal information to the rule-based pricing system, the base return target being at least one of: (i) a return on investment value, (ii) a net income value, (iii) an internal rate of return value, and (iv) a loan spread value;

identify a risk mitigant associated with the potential real estate deal based on the supplemental deal information;

identify a risk adder associated with the potential real estate deal based on the supplemental deal information;

input a value corresponding to the identified risk adder and risk mitigant;

revise the rule rule-based system in accordance with the value of the identified risk mitigant and the value of the identified risk adder;

receive additional prior real estate deal information;

validate the rule-based system with additional prior real estate deal information; and automatically determine a return target loan spread for the potential real estate deal by adjusting the generated base return target in accordance with the identified risk mitigant and the identified risk adder, based on the validated the rule-based system.

12. The deal controller of claim 11, wherein said storage device further stores at least one of: (i) a prior deal database, and (ii) a potential deal database.

13. The deal controller of claim 11, wherein said processor is further coupled to a communication device adapted to communicate with at least one of: (i) a deal originator device, and (ii) another deal controller.

14. A medium storing instructions adapted to be executed by a processor to perform a method of generating return targets for potential real estate deals, said method comprising:

receiving prior real estate deal information from a prior deal data source;

implementing a rule-based pricing system based on an analysis of the received prior real estate deal information;

receiving real estate deal information associated with a potential real estate deal;

determining a collateral type associated with the potential real estate deal;

receiving supplemental deal information associated with the potential real estate deal;

automatically generating a base return target for the potential real estate deal based on applying the collateral type and the supplemental deal information to the rule-based pricing system, the base return target being at least one of: (i) a return on investment value, (ii) a net income value, (iii) an internal rate of return value, and (iv) a loan spread value;

identifying a risk mitigant associated with the potential real estate deal based on the supplemental deal information;

identifying a risk adder associated with the potential real estate deal based on the supplemental deal information;

inputting into the computer a value corresponding to the identified risk adder and risk mitigant;

revising the rule-based system in accordance with the value of the identified risk mitigant and the value of the identified risk adder;

receiving additional prior real estate deal information;

validating the rule-based system with the additional prior real estate deal information; and automatically determining a return target loan spread for the potential real estate deal by adjusting the generated base return target in accordance with the identified risk mitigant and the identified risk adder, based on the validated rule-based system.

* * * * *

UNITED STATES PATENT AND TRADEMARK OFFICE
CERTIFICATE OF CORRECTION

| | | |
|---|---|---|
| PATENT NO. | : 7,606,755 B2 | Page 1 of 1 |
| APPLICATION NO. | : 10/066300 | |
| DATED | : October 20, 2009 | |
| INVENTOR(S) | : Opsahl-Ong et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1610 days.

Signed and Sealed this

Twelfth Day of October, 2010

David J. Kappos
*Director of the United States Patent and Trademark Office*